United States Patent [19]

Robinson et al.

[11] 4,305,353
[45] Dec. 15, 1981

[54] MOTOR BRAKE CONTROL SYSTEM FOR CONTROLLING MOTOR RUNAWAY

[75] Inventors: Charles E. Robinson, Rte. 1, Livermore, Colo. 80536; Melvin Nieberger, Ft. Collins, Colo.

[73] Assignee: Charles E. Robinson, Livermore, Colo.

[21] Appl. No.: 964,288

[22] Filed: Nov. 28, 1978

Related U.S. Application Data

[62] Division of Ser. No. 691,724, Jun. 1, 1976, Pat. No. 4,223,649.

[51] Int. Cl.³ ............................................. F02D 31/00
[52] U.S. Cl. .................................................. 123/333
[58] Field of Search ...................... 123/97 B, 97 R, 98, 123/102, 198 D, 198 R

[56] References Cited

U.S. PATENT DOCUMENTS

| | | | |
|---|---|---|---|
| 2,764,962 | 10/1956 | Warren et al. | 123/97 B |
| 3,220,392 | 11/1965 | Cummins | 123/97 B |
| 3,786,792 | 1/1974 | Pelizzoni et al. | 123/97 B |

Primary Examiner—Charles T. Jordan
Attorney, Agent, or Firm—Robert C. Dorr

[57] ABSTRACT

A motor brake control system for use on a motor having a motor brake retarder and a throttle fuel control is designed to respond to manual selection for sequentially retarding the selected cylinders in the motor. A transducer for sensing the speed of the motor is provided for generating a series of output pulses which access a high RPM detector and a low RPM detector. In the event that the motor exceeds a predetermined high RPM value, the brake control system activates all of the retarders to fully brake the motor. In the event that the brake retarders are on, either fully or partially, and the motor drops below a predetermined low RPM value, the brake retarders are released. Provision is made to prevent retardation of the motor as long as the throttle of the motor is being activated and retardation is further provided after deactivation of the throttle until the fuel in the fuel delivery system has been consumed. An emergency override, in the event that the brake control system fails or malfunctions, is provided so that the brake retarders can be manually activated.

6 Claims, 9 Drawing Figures

Fig_1

Fig_3

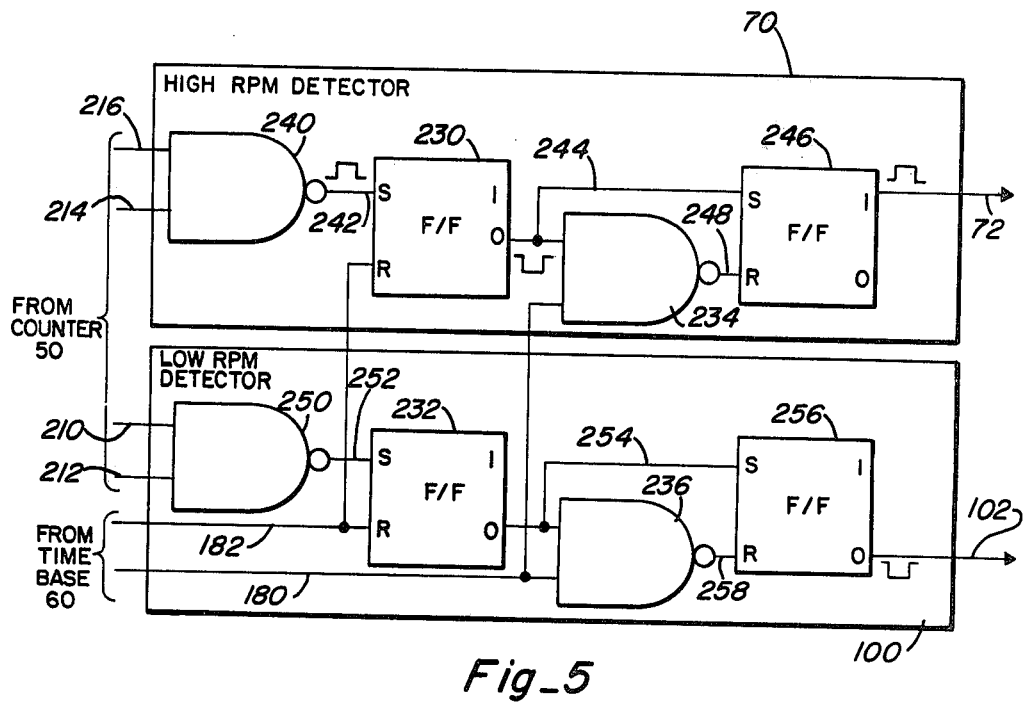
Fig_5
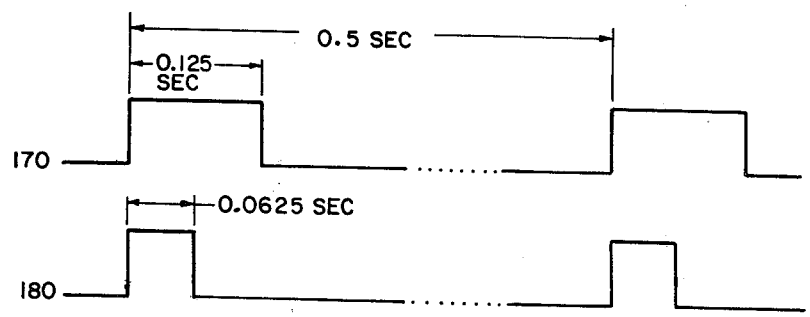
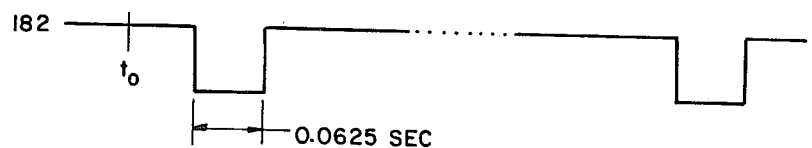
Fig_6

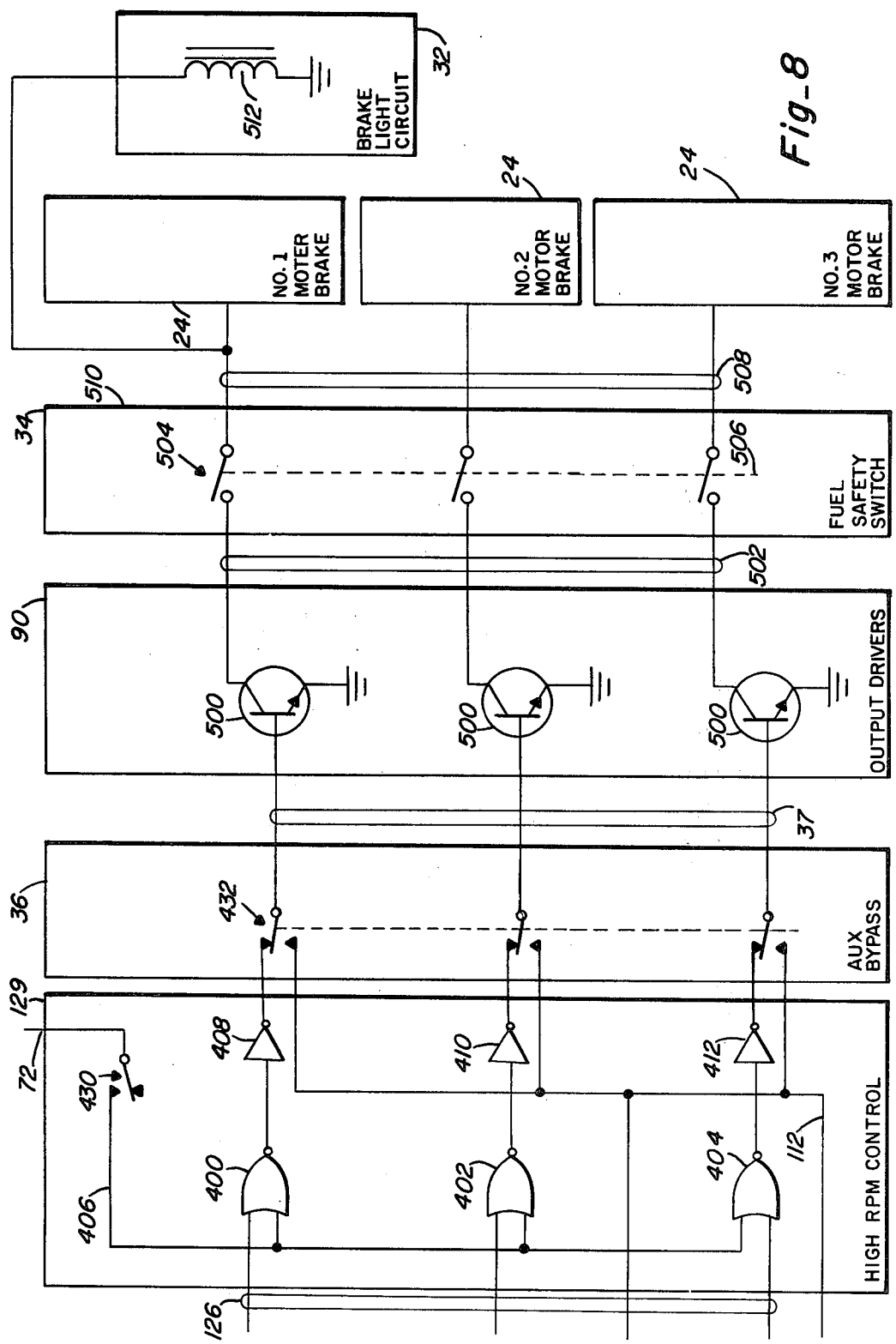

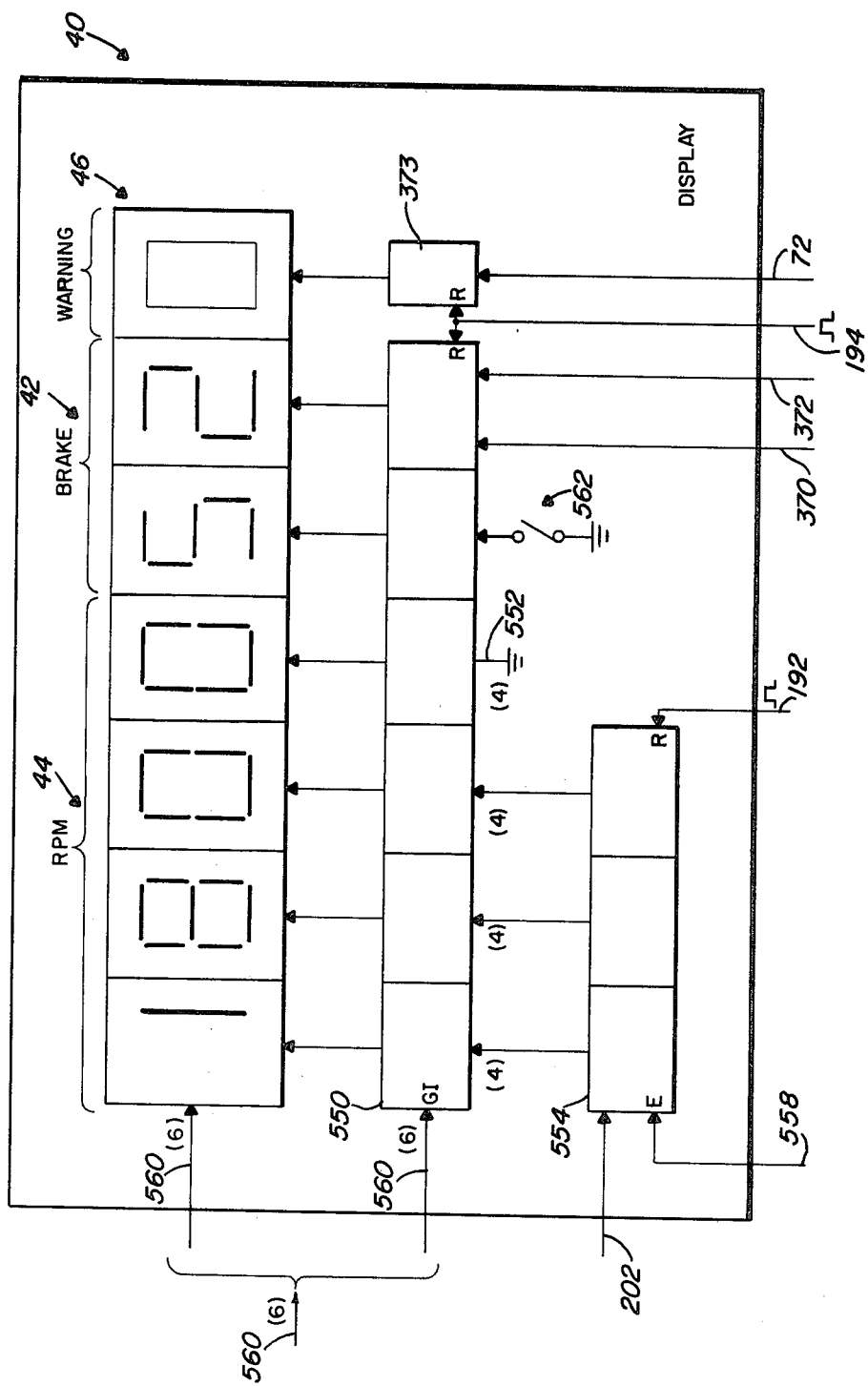
Fig_9

MOTOR BRAKE CONTROL SYSTEM FOR CONTROLLING MOTOR RUNAWAY

This is a divisional of Ser. No. 691,724, filed June 1, 1976 and entitled Motor Brake Control System, now U.S. Pat. No. 4,223,649.

BACKGROUND OF THE INVENTION

1. Field of the Invention

The present invention relates generally to motor control systems and more particularly to control systems for motor brake retarders.

2. Description of the Prior Art

Numerous prior art approaches have been conceived to brake or retard a motor other than through use of wheel brakes. A brief discussion of such prior art approaches follows. Systems for varying valve timing are disclosed in Pelizzoni et al., U.S. Pat. No. 3,786,792. In Pelizzoni appears an excellent discussion of various prior art engine brakes and that discussion is repeated below:

Other devices for relieving compression to enhance starting are disclosed in the Jackson U.S. Pat. No. 1,172,362 and the Rounds U.S. Pat. No. 1,175,820. Here the exhaust cams are provided with an auxiliary relief or lobe which is circumferentially spaced from the main lobe which opens the exhaust valve during the exhaust stroke. During normal operation the exhaust valve is not raised by the auxiliary lobe, but during starting the exhaust valve gear train is manually expanded so that the auxiliary lobe raises the exhaust valve during a portion of the compression stroke. In addition, the Rounds patent shows apparatus for manually adjusting the timing of the inlet and exhaust valves.

The Saurer U.S. Pat. No. 934,762 discloses an engine brake in which the exhaust cam is shifted circumferentially from its normal position to open during the "expansion" stroke, ignition being discontinued, so that air is compressed during the compression and "exhaust" strokes, and necessarily dumped at the beginning of the inlet and "expansion" strokes, so that the energy of the compressed air is not returned to the drive train during the expansion stroke.

The Kirchensteiner U.S. Pat. No. 1,637,118 and the Loeffler U.S. Pat. No. 1,947,996 disclose engine brakes in which the cam shaft is axially shifted for braking to de-activate the inlet valve and to drive the exhaust valve by a special double lobe cam, one lobe opening the exhaust valve during the intake stroke, while the other lobe dumps the compressed air near the end of the compression stroke. A graduated degree of braking is available in the Kirchensteiner engine brake by selectively inserting wedge elements beneath predetermined ones of the exhaust rocker arms to prevent the corresponding exhaust valves from closing, thereby eliminating the braking effect in the corresponding cylinders.

The engine brake according to the Ucko U.S. Pat. No. 2,002,196 obtains the results of the Loeffler brake without axially shifting the cam shaft. Rather, the rocker arm shaft is shifted eccentrically to render the push rods (and the inlet and exhaust cams) ineffective. An auxiliary double lobe exhaust cam is hydraulically coupled to the exhaust valve through a master piston, which is driven by the double lobe cam, and a slave piston which drives the exhaust valve rocker arm to open the exhaust valve during the intake and expansion strokes. A graduated braking effect is obtained by sequentially converting groups of one or more cylinders to air compressors.

The Cummins U.S. Pat. No. 3,220,392 discloses another engine braking system employing hydraulically coupled master and slave pistons, the slave piston driving the exhaust valve rocker arm, and the master piston being driven by an auxiliary exhaust cam, the injector rocker arm of the corresponding cylinder, or by the inlet or exhaust rocker arm of another cylinder, so as to dump compressed air at or near the end of the compression stroke. Unlike Ucko, however, the Cummins mechanism for opening an exhaust valve at or near top dead center does not interfere with the actuation of the exhaust valve by the normal exhaust valve actuating mechanism. Nevertheless, the independent mechanism for actuating the exhaust valve for braking requires considerable additional structure, thus increasing the complexity and cost of that engine brake. Furthermore, hydraulic coupling between the exhaust rocker arm of one cylinder and the inlet or exhaust rocker arm of the appropriate other cylinder would be difficult to arrange with a V-8 engine.

In the engine brake according to the Jones et al U.S. Pat. No. 3,439,662 a single auxiliary cam sequentially drives the master pistons, which in turn actuate the corresponding slave pistons to open the exhaust valves at the end of the compression stroke. Apparatus is included to change the timing of the opening of the exhaust valves in accordance with the engine speed in order to increase the braking effect with increasing engine speed.

The Siegler U.S. Pat. No. 3,547,087 discloses another engine brake employing a mechanism external to the intake and exhaust valve gear train, but in this system a solenoid operated hydraulic valve remote from the engine brake mechanism is actuated to pump up a piston so as to block the return movement of the rocker arm, thereby holding the intake or exhaust valve partially open throughout the braking period.

The Haviland U.S. Pat. No. 3,332,405 shows an engine brake in which the exhaust valve is opened at the end of the compression stroke by a separate engine braking cam when a plunger mounted in the rocker arm is hydraulically pumped up to engage the braking cam in response to a remote solenoid valve. In an effort to improve the response time of the system, a separate low pressure oil supply is required to keep the lines filled with oil.

The Jonsson U.S. Pat. No. 3,367,312 discloses an engine braking system in which the normal base circle of the exhaust cam is relieved to form an auxiliary base circle, the transition between the two base circles constituting an auxiliary ramp displaced circumferentially from the normal opening ramp, so that when the lash is removed from the exhaust valve train, the exhaust valve is opened by the auxiliary ramp at the end of the compression stroke. The lash is removed by a plunger mounted in the rocker arm which may be hydraulically extended when a remote valve is manually actuated to communicate the plunger with the lubrication pump. Inasmuch as there is no mechanism for hydraulically locking the plunger in the extended position, the rotating exhaust cam will reciprocate the plunger in its cylinder despite the hydraulic force supplied by the lubrication pump, thereby substantially impairing the performance of the engine brake. Furthermore, a very large force is applied to the exhaust valve and the plunger when the piston travels through its compression stroke, such force being a function of speed, exhaust valve opening, exhaust valve diameter and compression ratio. In a diesel engine such force would greatly exceed the opposite force on the plunger developed by the engine lubricating pump, so that the plunger would be collapsed and the desired braking effect minimized.

The Muir U.S. Pat. No. 3,525,317 discloses an engine brake providing a graduated braking effect by arranging a multiple-position switch for operation as the throttle pedal is retracted beyond the idling position. At the first position the fuel is cut off to create "motoring" friction, at the second position the exhaust valves are held continuously in a partially open position, and at the third position a butterfly valve in the exhaust mainfold is actuated to provide back pressure therein.

The Sweat U.S. Pat. No. 2,806,459 discloses an intricate device for changing the timing of motor valves in accordance with the speed of the motor by adjusting the position of the rocker arm fulcrum and thereby adjusting the clearance in the valve train and the amount of valve opening. The rocker arm fulcrum is driven by a motor, the electrical contacts for which are operated by a piston displaced by air pressure generated by a fan driven by the motor. The cam shaft is arranged to provide advanced timing when the clearance in the valve train is small, at high speeds, while at lower speeds the clearance is larger and the valve timing is thus retarded.

The Lieberherr U.S. Pat. No. 2,936,575 discloses apparatus for varying the valve timing of a supercharged gas engine in accordance with the pressure of the intake manifold or the governor fuel control shaft in an effort to obtain an approximately constant air-fuel ratio at all loads. The timing is varied by lateral displacement of the cam follower in response to the intake manifold pressure or the fuel control shaft.

The Ostborg U.S. Pat. No. 3,224,423 shows a valve timing system in which the timing of the inlet and exhaust valves is varied in accordance with the intake manifold pressure, the phase of the inlet and exhaust camshafts being shifted in opposite directions with respect to that of the crankshaft by means of planetary gear systems.

While all of the above prior art approaches provide for a plurality of different mechanical devices for retarding a motor, none of the above prior art approaches provide a system having a control for sequentially applying retardation to selected cylinders of the motor, for fully activating the brake retarder when the motor exceeds a predetermined high RPM, for deactivating the activated brake retarders when the motor drops below a predetermined low RPM, for automatically activating brake lights when retardation of the motor occurs, or for providing the operator of the motor with flexibility in controlling the degree of retardation.

The above features of the brake control system of the present invention substantially minimize the following problems which plague operators of large vehicles such as trucks. The problem of motor runaway and the ensuing mechanical damage to the motor is substantially prevented by the present invention in that whenever the speed of the motor exceeds a high predetermined RPM value, all cylinders of the motor are fully retarded. Should the present invention fail to detect the high RPM limit, the mechanical governor could function in the conventional fashion. Unfortunately, in the typical motor runaway situation, the mechanical governor flies apart and the motor then proceeds to destroy itself. The system of the present invention activates retardation prior to the activation of the mechanical governor and fully applies retardation to all cylinders. In addition, the present invention signals a warning to the operator or, if no operator is present, the system can optionally shut the motor down.

Another problem inherent to operators of large vehicles is that generally encountered while traveling down a steep incline such as those found in the mountains. In such situations, all cylinders are generally retarded to counteract the force of momentum of the truck down the hill. In the event that a wet, icy or sandy spot is encountered on the road, the motor, due to the retardation sometimes stalls. Such a stall is fatal to the operation of the vehicle because power is lost to all functions and the wheels skid. The following weight of the load, the retarding effect of the motor brake and the steering, shifting and/or wheel braking effort of the operator all contribute to a jack-knife condition causing destruction to the truck. The system of the present invention substantially prevents jack-knifing since if the speed of the motor drops below a low predetermined RPM value, the retarders are automatically and instantaneously released. Stalling therefore is prevented. When the speed of the motor regains it's normal operating speed, the retarders are sequentially activated to apply retardation. Another problem for operators of vehicles carrying large loads occurs when those loads are what is commonly termed "live". Live loads include loads containing live animals, liquids, or hanging and swinging loads. When carrying live loads, it is highly desirable to apply retardation in a sequential fashion after predetermined intervals have elapsed. The system of the present invention prevents damage to live loads by providing for the sequential application of retardation to the various cylinders of the motor.

Furthermore, since the present invention, provides for sequential application of retardation to the various cylinders, up and down shifting by the driver through the transmission is substantially eliminated since effective control of the power of the motor can be accomplished through the manual selection of the degree of retardation. For example, the operator of the present invention may selectively release retardation from six cylinders to four cylinders and then to two thereby increasing the power from the motor to the vehicle with each such selection. This is comparable to controlling the power delivery from the motor to the vehicle by controlling the shifting through the transmission. The system of the present invention is highly adaptable to situations involving "green" or inexperienced drivers who for the first time encounter situations, as in the mountains, of increased manual shifting of the transmission. Such provisions for inexperienced drivers are highly desirable since the accident rate of inexperienced drivers is much greater than that of experienced drivers. In addition, through the reduction of manual shifting (upshifting and downshifting), greater fuel economy is achieved and a great time savings is experienced in traveling from point to point through rugged and hilly terrain. These time and fuel savings continue in high population and traffic density areas.

Substantial reduction in maintenance costs is obtained with the motor brake control system of the present invention. In a typical application, as mentioned above, due to the fact that manual shifting is greatly reduced, decreased fuel consumption is obtained as well as increased savings in road and turn-around time. Due primarily to the fact that manual shifting is greatly reduced, there is less wear and tear on the drive train and motor resulting in a reduced number of expensive oil changes, less overhaul time in the repair shop, and considerable savings in relining the brakes and in replacing the tires since greater reliance and flexibility can be provided through engine retardation rather than wheel braking. Other advantages and features of the present invention include increased public safety due to the fact that jack-knifing, skidding, and engine stall are greatly reduced through use of the motor control system of the present invention. Such reduction of accident occurrences is especially valuable in loads including explosives, and chemicals wherein a single accident can affect numerous members of the public. Furthermore, since upshifting and downshifting is minimized through the teachings of this invention, less fuel is consumed and the various pollutants generated into the atmosphere from such excessive fuel consumption is minimized. This is especially true when the motor control system of the present invention is used to speed up and slow down vehicles while moving in heavy traffic conditions in a metropolitan area. And the public benefits from a reduction in the noise pollution that occurs when upshifting and downshifting to reach certain RPM's and when conventional brake retarders generate considerable "popping" noise due to the fuel lag problem wherein retardation occurs before the fuel within the fuel line system is fully combusted. Finally, the provision of a motor speed sensor and accompanying display provides a more accurate readout than currently obtainable with mechanical tachometers. However, the present invention contemplates the use of both the electronic display and the mechanical tachometer to operate in parallel thereby to provide a further safety feature for the operator of the vehicle in that he can visually compare the accuracy of the two readouts.

OBJECTS OF THE INVENTION

It is an object of the present invention to provide a novel motor brake control system for use on a motor having a motor brake retarder which selectively activates retardation of the cylinders of the motor.

It is another object of the present invention to provide a novel motor brake control system for use on a motor having a motor brake retarder wherein the system responsive to the speed of the motor fully activates the retarder when the speed of the motor exceeds a predetermined RPM value.

It is still another object of the present invention to provide a novel motor brake control system for use on a motor having a motor brake retarder wherein the system is responsive to the speed of the motor for deactivating the activated brake retarder when the speed of the motor drops below a predetermined RPM value.

It is another object of the present invention to provide a novel motor brake control system for use on a vehicle having a motor brake retarder wherein the system automatically activates the brake lights whenever retardation occurs.

It is another object of the present invention to provide a novel motor brake control system for use on a motor having a motor brake retarder and a throttle fuel control wherein the system activates instantaneous retardation only when the fuel to the motor is substantially combusted.

It is still another object of the present invention to provide a novel brake control system for use on a motor having a motor brake retarder wherein an emergency override circuit is provided enabling manual control of the retarders to brake the motor in the event of system malfunction.

It is still another object of the present invention to provide a novel motor brake control system for use on a motor having a motor brake retarder wherein the system responsive to the speed of the motor activates the retarder when the speed of the motor exceeds a predetermined high RPM value and deactivates any activated retarders when the speed of the motor drops below a predetermined low RPM value and wherein the system responsive to a manual input sequentially enables retardation on the manually selected cylinders in a sequential fashion.

It is still another object of the present invention to provide a novel motor brake control system for use on a motor having a motor brake retarder wherein the system responsive to the speed of the motor activates the retarder when the speed of the motor exceeds a predetermined high RPM value and deactivates any activated retarders when the speed of the motor drops below a predetermined low RPM value and wherein the system responsive to a manual input sequentially enables retardation on the manually selected cylinders in a sequential fashion, and wherein the system automatically activates brake lights whenever retardation occurs, and wherein the system activates instantaneous retardation when the fuel to the motor is substantially combusted.

SUMMARY OF THE INVENTION

The motor brake control system of the present invention interacts a conventional motor brake retarder and motor so that the operator of the vehicle containing the motor can selectively choose the degree of retardation thereby effectuating retardation of any number of cylinders of the motor. The motor brake control system of the present invention based on the manual selection sequentially applies retardation to selected cylinders of the motor after a predetermined delay. A sensor responsive to the speed of the motor generates a plurality of pulses which enters the control system of the present invention to automatically activate retardation of all cylinders of the motor in the event the speed of the motor exceeds a predetermined high RPM value, and in the event that the motor is undergoing any retardation should the speed of the motor fall below a predetermined low RPM value, the control system automatically deactivates all retardation of the motor. Whenever retardation of the motor occurs, irregardless of the degree of retardation, brake lights on the vehicle are automatically activated. A throttle override is provided so that as long as the throttle of the motor is being activated, no retardation can possibly occur. In the event, that the operator of the vehicle releases his foot from the throttle, the brake retarders are automatically activated to whatever degree selected by the operator. However, a fuel lag circuit is provided so that even though the operator releases his foot from the throttle, retardation of the motor instantaneously occurs when the fuel in the fuel delivery system is combusted. Finally, an emergency override circuit is provided so that in case of malfunction of the control unit of the brake control system of the present invention, the operator of the truck can override the brake control system and conventionally activate the brake retarders.

Other objects, advantages and capabilities of the present invention will become more apparent as the description proceeds taken in conjunction with the accompanying drawings.

DESCRIPTION OF THE DRAWINGS

FIG. 5 is an electronic schematic of the high RPM detectors and the low RPM detectors shown in FIG. 3.

FIG. 6 is the timing relationship for the high and low RPM detectors of FIG. 5.

FIG. 8 is the electronic schematic for the high RPM control, the auxiliary bypass circuit, the light circuit, the output drivers circuit, and the safety circuit shown in FIG. 3.

FIG. 9 is a block diagram representation of the display of the present invention.

GENERAL DESCRIPTION

Figure 1:
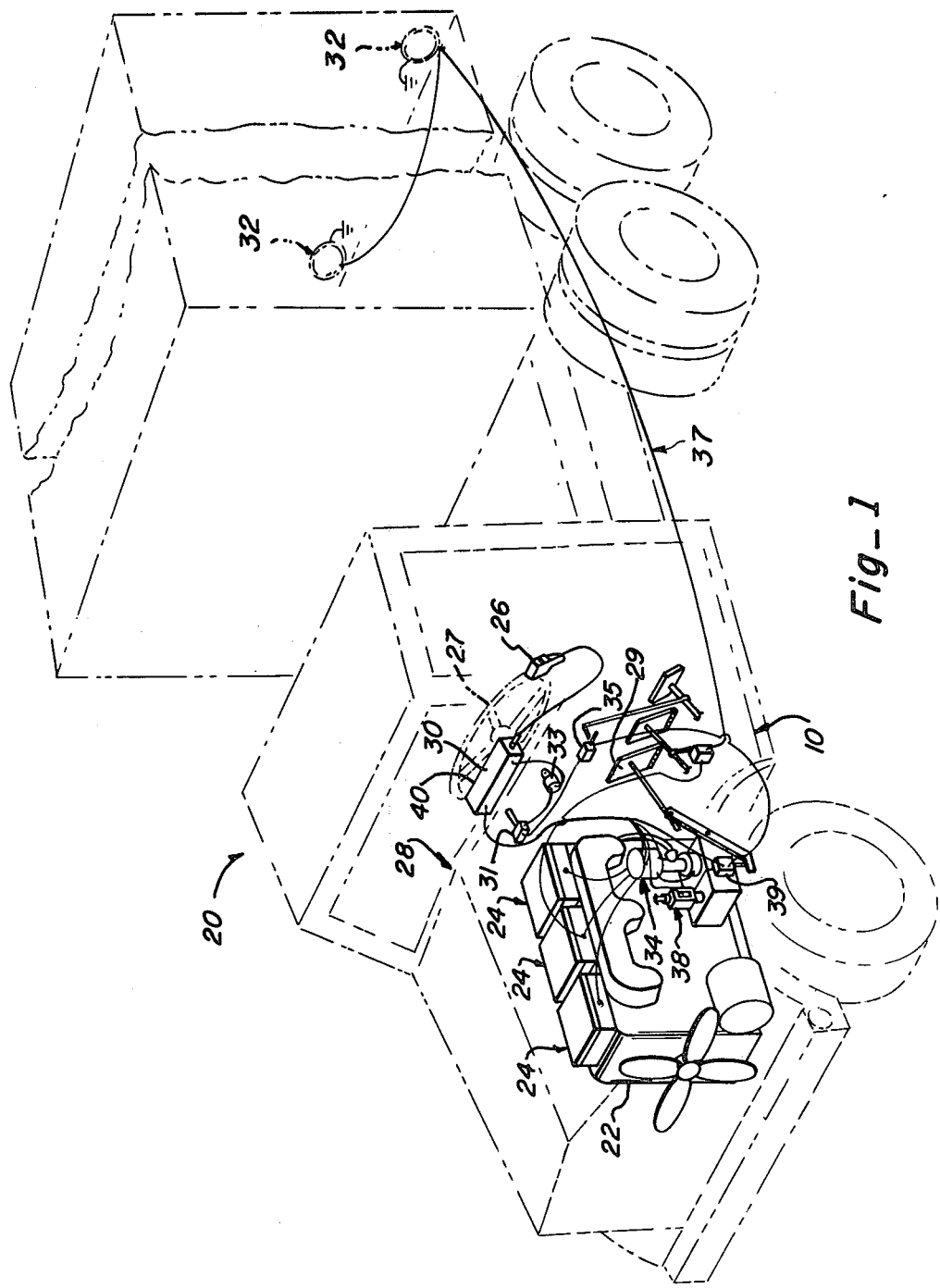
FIG. 1 is a perspective view of a vehicle in which the physical placement of the component parts of the present invention are emphasized.
Figure 2:
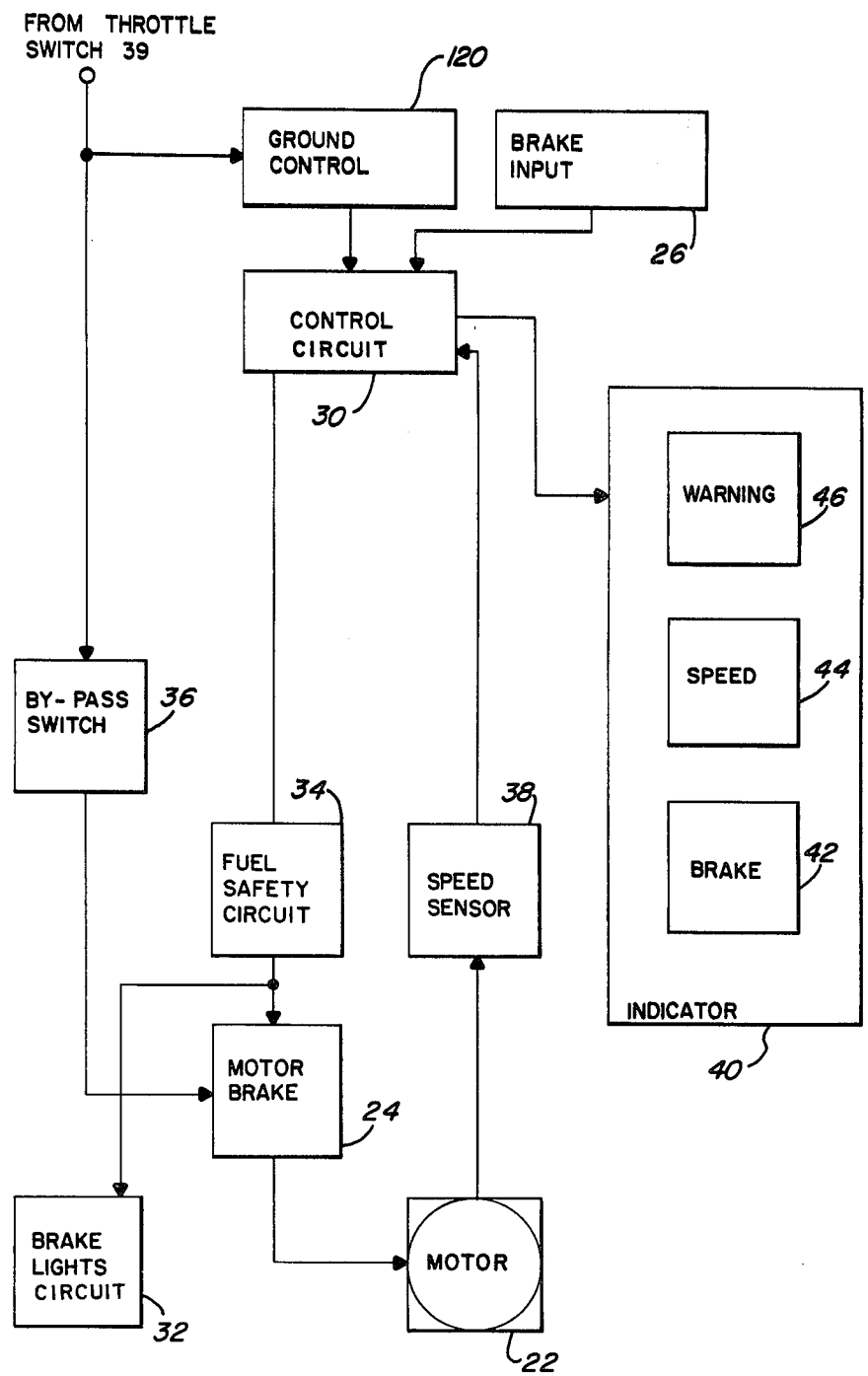
FIG. 2 is a block diagram representation illustrating the interconnection of the various functional components physically shown in FIG. 1.

The motor brake control system 10 is shown mounted on a truck 20 in FIG. 1 and is shown in block diagram schematic form in FIG. 2. It is to be expressly understood that while this motor braking control system 10 of the present invention finds application in a preferred embodiment for use on a conventional six cylinder truck, the disclosure in FIGS. 1 and 2 is not meant to limit or delimit the scope of this invention since the motor control system 10 of the present invention finds application on any type motor including those for auto, bus, construction equipment, farm equipment, diesel engines, gasoline engines, pumps, etc. and for those with any number of cylinders.

A conventional internal combustion motor 22 is the object of the present invention sought to be controlled. One conventional means for controlling the motor 22 is by means of a retarder motor brake 24 of the type conventionally known as the Jacobs Engine Brake manufactured by the Jacobs Manufacturing Company, West Hartford, Conn. 06110 which retards two cylinders in a master-slave relationship. Such conventional motor retarders essentially convert the internal combustion motor into a power absorbing air compressor thereby causing the motor to produce work under conditions which, at the instant before, it was not required to do. Essentially, the moving vehicle through the drive train and the momentum of movement causes the motor to act as an air compressor thereby retarding motion of the vehicle.

The motor brake control system 10 of the present invention interacts with the conventional brake 24 and motor 22 as follows. The operator of the truck 20 when desiring to activate the motor brake 24 thereby retarding or slowing down the truck 20, selects the degree of retardation by appropriately activating the hand held brake input 26 located on the steering wheel 27 of the truck 20. The operator of the vehicle 20 can retard the motor 22 in a plurality of fashions ranging from retarding two cylinders, four cylinders, or all six cylinders, in the preferred embodiment of a six cylinder diesel truck motor 22. The signals from the brake input circuit 26 access a control circuit 30 which processes the signals and activates the motor brake 24 and a brake light circuit 37 and through an optional fuel safety circuit 34. The brake light circuit 37 automatically activates the rear brake lights 32 of the truck thereby indicating to motorists following the vehicle 20 that the vehicle is slowing down. In the preferred embodiment, the brake light circuit 37 automatically activates the brake light 32 whenever it is desired to brake the motor 22 whether or not two, four, or six cylinders are retarded.

The motor brake system 10 of the present invention further includes a speed sensor 38 which cooperates with motor 22 to deliver into the control circuit 30 an accurate representation of the speed of the motor 22. The control circuit irregardless of the inputs being received from brake input 26 automatically activates the motor brake 24 when the speed of the motor 22 exceeds a predetermined high value. This is commonly termed "motor-runaway". Therefore, should the motor 22 commence racing at an uncontrolled RPM, the control circuit 30 automatically senses the motor exceeding a predetermined high RPM value and automatically activates the brake retarder 24 on all six cylinders.

In the event that the brake input 26 is in the mode of activating retardation of the motor 22 (e.g., in the six-cylinder preferred embodiment of either two, four, or six cylinders) and the motor 22 drops below a predetermined low RPM value, the control circuit 30 takes the necessary steps to stop retardation of the motor 22. This eliminates the problem commonly termed as "stalling". Therefore, when the operator of the vehicle 20 has, for example, retarded all six cylinders in the preferred embodiment, the motor 22 is prevented from stalling (i.e., from dropping below a predetermined low RPM value of speed) by the control circuit 30 automatically deactivating the motor brake 24.

Finally, various indications are provided by indicators 40 which are mounted onto the dash 28 of the vehicle 20 to provide visual feedback to the operator of the vehicle 20. These indicators, as shown in FIG. 2, may include, for example, indicator 42 showing the degree of brake selected by the operator (i.e., two, four, or six cylinders), the speed 44 of the motor in RPMs, and a warning indicator 46 becoming activated when the predetermined high RPM value is exceeded.

Finally, the control circuit 30 sequentially applies the various degrees of retardation to the motor 22. For example, if the operator of the truck 20 has selected to retard all six cylinders, the control circuit 30 causes the first two cylinders of the motor to be retarded and to act as an air compressor, after a predetermined period of time, the next two cylinders of the motor are retarded and, after a second period of delay of time, the final two cylinders of the motor are retarded. This arrangement is especially suitable for vehicles which carry what is commonly termed "live" loads such as liquid, animal or hanging loads. It is well known that excessive retardation of the engine 22 causes damage to such live loads and may cause the operator of the vehicle to lose control.

In normal operation of the vehicle 20, the operator selects the degree of retardation desired. When the operator releases his foot from the accelerator pedal 29, the throttle control circuit microswitch 39 becomes activated to power the control 30 thereby effectuating retardation to occur. The throttle switch 39, the clutch switch 35, the brake ON-OFF switch 31, and the ignition switch 33 are all in series connection. The control circuit 30 becomes activated only if all switches 39, 35, 31 and 33 are ON. Turning any one OFF results in deactivation of control circuit 30. The ON-OFF switch 31, the ignition switch 33, and the clutch switch 35 are found in conventional retarder systems. The ON-OFF switch 31 conventionally provides manual control by the operator to selectively deactivate the entire brake system, the ignition switch 33 provides power to the retarders only when the motor is turned on, and the clutch switch 35 allows the operator to automatically stop retardation by depressing the clutch.

The optional fuel cut-off circuit 34 further prevents delivery from the control circuit 30 to the brakes 24, holding the retarder brakes 24 in a deactivated state until the fuel to the motor is combusted. This eliminates the commonly termed "fuel-lag" problem plaguing conventional retarder brakes.

In the event that the motor brake control system 10 of the present invention fails to properly operate, a bypass switch 36 is provided on the dash 28 interconnecting the throttle switch 39 directly with the motor brake 24 to operate the motor brake and the motor 22 in a conventional fashion. Such a feature is highly desirable since, in case of malfunction of the control circuit 30, the operator of the vehicle 20 is provided with the option to cut out power to the malfunctioning circuit and to conventionally operate the retarders 24.

DETAILED DESCRIPTION

Figure 3:
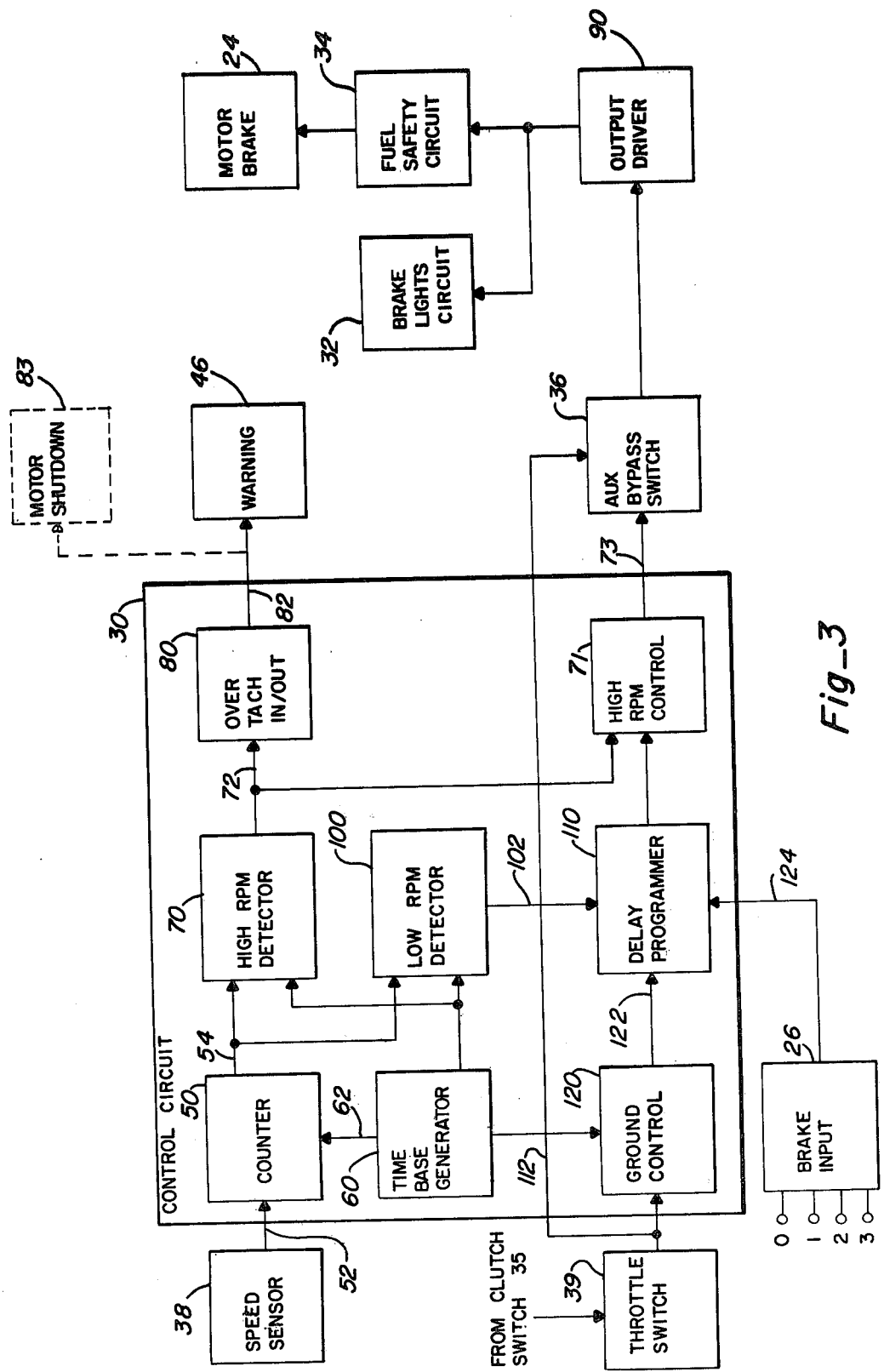
FIG. 3 is a more detailed block diagram representation illustrating the various component parts of the control circuit shown in FIG. 2.

The brake control system 10 of the present invention is shown in FIG. 3 with the control circuit 30 in greater detail. The control circuit 30 is continuously on line to sense the speed of the motor 22 through speed sensor 38. The speed sensor 38 may be any conventional speed sensing device which accurately converts the mechanical speed of the motor 22 into a binary electrical equivalent for delivery into a counter 50. The speed sensor 38 may be any conventional approach, but preferably, it is of the high accuracy type disclosed in co-pending application entitled "Motor Speed Sensor" by Robinson filed on Jun. 1, 1976, Ser. No. 691,450.

The counter 50 is operative only in a given time frame from the time base generator 60. The time base generator 60 delivers a sampling window or frame over lead 62 into the counter 50 thereby enabling the counter 50 only to count pulses from the speed sensor 38 during the given time window or frame. Thus, the counter 50 is activated only at given periodic intervals to sample the speed of the motor 22 by counting pulses appearing on lead 52 within a given window or frame appearing on lead 62. At the conclusion of the sampling time, the total number of pulses counted by counter 50 appears on lead 54.

The high RPM detector 70 receives the number of counted pulses appearing on lead 54 and determines whether the number exceeds a predetermined value. Since the pulses appearing on lead 54 are proportional to the speed of the motor 22, i.e., a large number of pulses within a given time frame is indicative of a high RPM speed and a small number of pulses within the given time frame is indicative of a small RPM speed. If the count on lead 54 exceeds the predetermined high RPM value, the motor 22 is in a runaway condition and the high RPM detector 70 delivers a signal over lead 72 to the over-tach circuit 80 which provides an activation signal over lead 82 to a warning indicator 46. Lead 72 is also delivered to a high RPM control 71. In the event the high RPM detector 70 detects the motor exceeding the predetermined value, a signal is produced on lead 72 to the over-tach circuit 80 and also over lead 72 to the high RPM control circuit 71 which causes all cylinders of the motor 22 to be retarded. The output of the control circuit 71 appears on lead 73 and is delivered into the brake lights circuit 37 to automatically cause the brake lights 32 of the vehicle 20 to turn on. The optional fuel lag or safety circuit 34 becomes activated thereby enabling retardation of all six cylinders of the motor 22. As will be discussed later, if the fuel lag circuit 34 is not used, retardation occurs immediately. A second optional circuit 83 may be provided which causes the motor to shut down in a conventional fashion should a signal appear on lead 82.

In summary, when the motor 22 exceeds a predetermined high RPM value of speed, the high RPM detector 70 becomes activated to retard all cylinders of the motor 22. In this manner, in any runaway condition existing for the motor 22, the control circuit 30 automatically provides the warning indication 46 to the operator and concurrently provides retardation of the motor thereby preventing excessive damage to the motor 22. It is readily apparent that the control circuit 30 operates at electronic speeds and, in fact, commences to retard the motor 22 before the operator of vehicle 20 becomes aware of the warning light 46. The reaction time of the operator is thus eliminated and engine runaway can be early detected and corrected. If the optional fuel lag circuit 34 is used, the warning light 46 informs the operator of the runaway condition and the operator releases his foot from the throttle so that the circuit 34 activates to allow full retardation. Additionally, the signal output of the high RPM detector may be used by a skilled mechanic to stop the motor 22 from operation rather than to activate the retarders as shown by circuit 83.

The output of counter 50 is further delivered over lead 54 to a low RPM detector 100. In the same manner as previously discussed, if the total number of pulses counted within the time frame as provided over lead 54 is lower than a predetermined value, the low RPM detector 100 becomes activated and a signal is delivered over lead 102 to the delay programmer circuit 110. In this mode of operation, the motor brake circuit 24 has been priorly activated, in a manner to be discussed in the next paragraph, and the motor 22 is undergoing engine retardation. However, if the retardation of the motor 22 causes the motor 22 to drop below a predetermined low value, the low RPM detector 100 outputs a signal over lead 102 into the delay programmer 110 to release the motor brake 24 thereby stopping all retardation of the motor 22. This provision finds applicability to situations in which the operator of vehicle 20 is driving the vehicle down a 6% or more grade and is using primarily the motor brake 24 to inhibit momentum buildup. At this time the foot is off the throttle and microswitch 39 turns ON, the brake switch 31 is already on, the ignition switch 33 is already ON, and the clutch is not depressed making switch 35 ON. The control circuit 30 is activated by the release of the throttle by the operator. In the event that wet pavement or loose sand is encountered, and retardation is ON, in conventional situations the motor will stall and die temporarily, but due to the momentum of the truck, the tires commence to skid thereby causing a sudden jerk which often results in a jack-knife situation or loss of control by the operator of the vehicle. Stalling of the motor 22 is prevented by the low RPM detector 110 which temporarily prevents retardation of the motor when the speed of the motor 22 drops below a predetermined value. Therefore, the motor never stalls and the jack-knife situation is completely prevented.

In normal operation, the operator of vehicle 20 is driving down the road, a situation arises in which he wishes to slow the vehicle 20 down. The operator had previously dialed in the correct amount of retardation at the brake input circuit 26 so that when the operator releases his foot from the throttle thereby activating microswitch 39, the output 112 of the switch 39 is delivered into a ground control circuit 120. The output of the ground circuit 120 is delivered over lead 122 and into the delay programmer circuit 110. The output of the brake input circuit 26 is delivered over lead 124 into the delay programmer circuit 110. The delay programmer circuit 110 becomes operative only in the event that a signal appears on lead 122 from the ground circuit 120. Therefore, the operator of vehicle 20 cannot operate the retarders unless he has removed his foot from the throttle thereby closing switch 39. This is understandable since it is not desired to continually inject gas into a motor which is acting in the air compressor mode. Therefore, when a signal appearing on lead 122 indicative of a release of the gas throttle, the delay programmer 110 becomes activated. In this mode of operation, if the operator had previously dialed in a retardation value of "2" (i.e., four cylinders to be retarded), the brake input circuit 26 delivers this information over lead 124 and when the operator releases his foot from the throttle, the delay programmer 110 operates to sequentially apply retardation to the first two cylinders and then after a predetermined time delay apply retardation to the next two cylinders. A retardation value of "2" means that four cylinders are to be retarded, a retardation value of "1" means that two cylinders are to be retarded and a retardation value of "3" means that six cylinders are to be retarded. A retardation value of "0" means OFF. These values are preferable for the disclosed embodiment. It is to be expressly understood that some brake retarders 24 retard only one cylinder and that for such systems the switch 26 would have an input for each cylinder. Furthermore, the disclosed preferred embodiment uses a six cylinder motor, some motors, however, use eight or more cylinders and the teachings of this invention can be modified by a skilled mechanic to embrace more or less than six cylinders.

In operation, therefore, the operator of vehicle 20 is given several options upon seeing an obstacle in the road ahead or upon driving in adverse conditions. He may select to dial in "0" retardation and to release only the throttle thereby inhibiting gas flow into the motor and slowing the vehicle down. He may select to dial in "1" retardation and to release his foot from the throttle so that two cylinders of his motor are retarded thereby increasing the rate of slowing down. He may select to dial in "2" retardation and to release his foot from the throttle so that four cylinders of the motor 22 are retarded thereby causing his vehicle to slow at even a greater rate than previously discussed. And finally, he may desire to dial in "3" retardation and to remove his foot from the throttle so that all six cylinders are retarded. In event of retardation, the delay programmer circuit 110 sequentially applies retardation of the motor 22 by first retarding two cylinders, then after a predetermined time, retarding the next two cylinders and after still another predetermined time interval, retarding the final two cylinders. Of course, in addition to all of the above, the driver may also wish to apply his normal wheel brakes.

In the event that upon selecting the value for the brake input circuit 26 that the entire brake control system as previously discussed fails to operate, the operator activates the auxiliary bypass switch 36 which immediately activates the output driver 90 and applies full retardation of all six cylinders immediately whenever the operator releases his foot from the throttle. It is to be expressly understood, that the auxiliary bypass switch bypasses all of the control circuitry 30 of the present invention.

Figure 4:
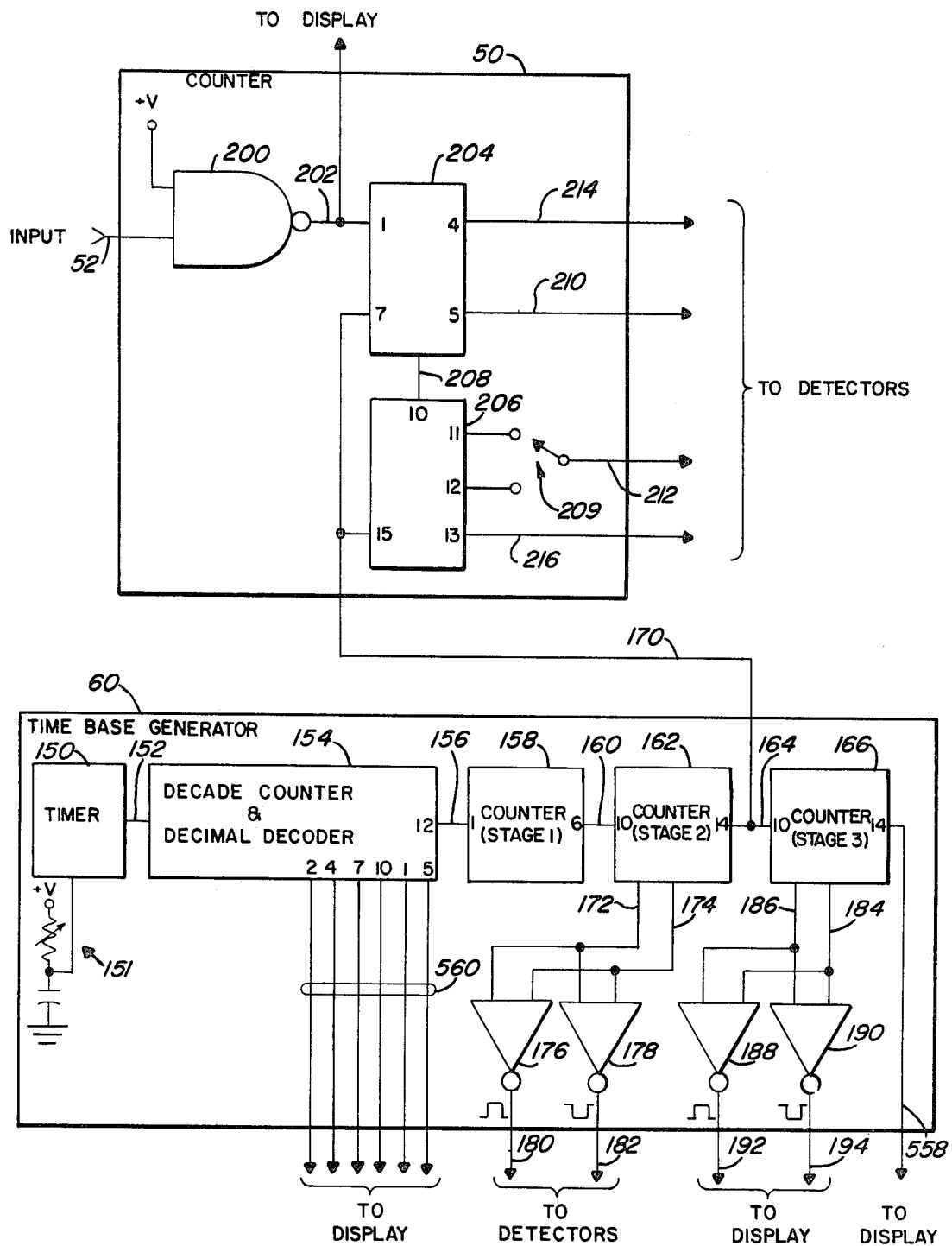
FIG. 4 is the electrical schematic of the counter and time base generator shown in FIG. 3.

In FIG. 4, the details of the counter 50 and the time base generator 60 are given. The time base generator 60 utilizes a timer 150 which is preferably an astable multivibrator chip comparable to that manufactured by Archer as Model No. RS 555. The timer 150 is designed to continually generate a frequency of pulses preferably in the range of 100 to 50,000 Hz (adjusting a conventional RC time circuit 151). It is to be expressly understood that any of a number of conventional timing generators may be used including a crystal oscillator. The output from the timer 150 is delivered over lead 152 to a decade counter and decimal decoder 154, which is preferably a conventional CD 4017 AD chip made by RCA. The pin number designations are shown for the above-stated RCA product. The output is delivered over lead 156 to counter 158. The output of counter 158 is interconnected over lead 160 to the input of another counter 162 whose output delivered over lead 164 is further connected to still another counter 166. Counters 158, 162 and 166 are conventional and may comprise for example, conventional counters such as those manufactured by the RCA Corporation as Model No. CD4518B. The pin number designations shown in FIG. 4 are for the above-stated RCA product. The last stage of the counter is connected over lead 558 to the display unit 40 in the manner which will be hereinafter discussed. The output of the second stage of the down counter 162 is delivered over lead 170 to the counter 50, in a manner which will be subsequently discussed.

Various outputs of the counters 158, 162, and 166 are now decoded. In the second stage 162 of the counter, the two outputs 172 and 174 are delivered to two decoders 176 and 178. The output of decoder 176 appears on lead 180 and is then delivered into both the low RPM detector 100 and the high RPM detector 70. The output of the second decoder 178 appears on lead 182 and is also delivered to both the high RPM detector 70 and the low RPM detector 100. The third stage of the counter 166 is connected over leads 184 and 186 to decoders 188 and 190. The output of decoder 188 appears on lead 192 and is delivered to the display circuit 40 in a manner to be hereinafter discussed. Further, the output of decoder 190 appearing on lead 194 is also delivered to the display circuit 40. Decoders 176, 178, 188 and 190 are conventional and may comprise any of numerous conventional decoding circuits. It is to be understood that the inputs occurring on leads 172 and 174 and those occurring on leads 184 and 186 represent binary values appearing in the counters 162 and 166 and are conventionally decoded.

The operation of the time base generator 60 is as follows. The timer 150 generates a stream of pulses which accesses the counters 158, 162, 166 in order that the contents of the counter is continually incremented.

Each input pulse from the timer 150 appearing on lead 156 causes the counter to increment by the count of one. As the contents of the counter are incremented, a predetermined value is reached which is detected by decoder 176 which then signals this detection by placing a signal on lead 180. The counter continues to be incremented until a second predeterimined value is reached which is detected by decoder 178 which correspondingly places a signal on lead 182. In a manner to be subsequently discussed, the signal appearing on lead 180 occurs first in time; after a period of time, a signal is placed on lead 182 as shown in FIG. 6. These pulses are used to control flip-flops found in the high RPM detector 70 and the low RPM detector 100. Of course, in a conventional fashion, as the contents of the counter reach a maximum value, the counter with the next pulse from the timer is loaded with all zeroes so that the counting sequence can commence from the very beginning. In this manner, the counter is continually counted to maximum, then starts over, thereby providing a repetition of the signals appearing on leads 180 and 182. Adjustment of RC control 151 adjusts the rate of counting and, therefore, controls the time between the pulses on leads 180 and 182.

In a similar manner, decoders 188 and 190 provide pulses to the display circuit 40. The provision of these pulses occurs in a different time sequence than the first priorly discussed pulses.

The counter 50 will now be discussed. The counter 50 receives a stream of binary pulses on input 52 which accesses NAND gate 200 in a conventional fashion. The NAND gate 200 is continuously biased to a positive voltage source so that the NAND gate 200 primarily acts as a buffer to the input signal appearing on lead 52. The output of NAND gate 200 is delivered over lead 202 to a binary counter 204 which is interconnected with a second binary counter 206 over lead 208. The binary counters 204 and 206 comprise the same structure as those previously discussed for counters 158, 162 and 166. The counters 204 and 206 are each activated simultaneously by a pulse from the second stage of the counter 162 over lead 170. In operation, as the counters 158, 162, and 166 count and provide activation signals first on lead 180, second on lead 182, an output signal is generated on lead 170 to reset the counter 50 so that it can start counting pulses occurring in input 52 when the signal on lead 170 goes low. The counter 50 continuously counts pulses until counter 50 is reset by the next subsequent high pulse occurring on lead 170 as shown in FIG. 6. Outputs from the counters 204 and 206 are provided over leads 214 and 216 to the high RPM detector 70 and over leads 210 and 212 to the low RPM detector 100. However, switch 209 which is on the dash of the vehicle 20 may be manipulated to provide a different output over lead 212.

The details of the high and low RPM detectors 70 and 100 will now be discussed based on the disclosure in FIG. 5. Both the high and low RPM detectors 70 and 100 receive the reset pulses over leads 180 and 182 from time base 60. The pulse on lead 182 resets flip-flop 230 in the high RPM detector 70 and flip-flop 232 in the low RPM detector 100. The signal appearing on lead 180 inputs NAND gate 234 in the high RPM detector 70 and NAND gate 236 in the low RPM detector 100. In the high RPM detector, inputs 214 and 216 are received from counter 50 by NAND gate 240 which functions as a decoder. The output of NAND gate 240 is delivered over lead 242 to the set side of flip-flop 230. The zero side of flip-flop 230 is interconnected to the remaining input of NAND gate 234 over lead 244 and lead 244 further accesses the set input to flip-flop 246. The one output of flip-flop 246 is delivered over lead 72 to the output driver circuit 90. The output of NAND gate 234 is delivered over lead 248 to the reset side of flip-flop 246.

In operation, when a value in excess of the predetermined high value is placed on the inputs to NAND gate 240, the output of NAND gate 240 on lead 242 goes low causing the flip-flop 230 to set placing a low on lead 244 which in turn causes the flip-flop 246 to set thereby delivering a high signal on lead 72. The appearance of a positive going pulse on lead 180 from decoder 176 causes the output of NAND gate 234 to go low thereby resetting flip-flop 246. The appearance of a negative going pulse on lead 182 subsequent to the previous positive going pulse causes flip-flop 230 to reset. The high RPM detector 70 is now ready for the next count.

Figure 7:
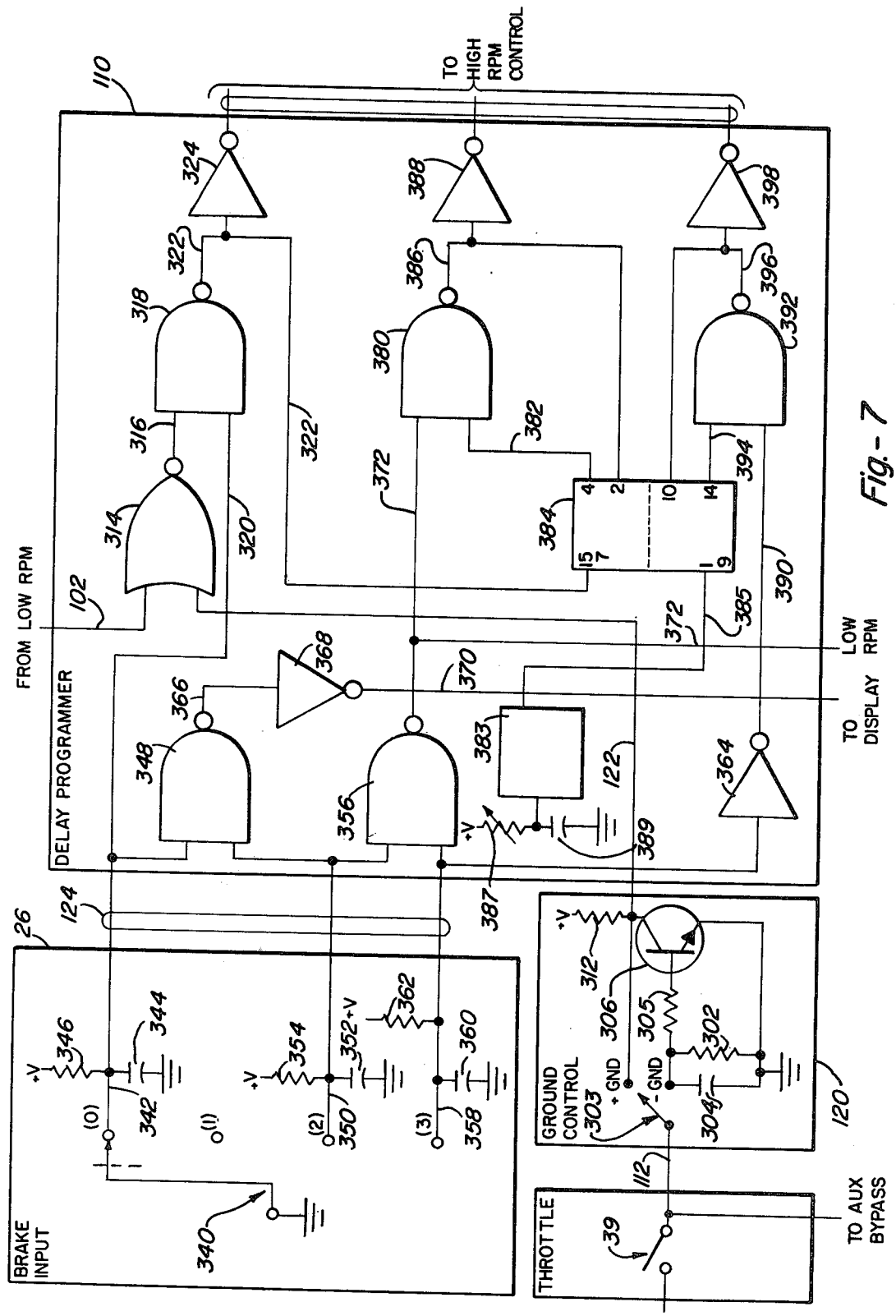
FIG. 7 is the electronic schematic for the brake input circuit, the throttle control input circuit and the delay programmer circuit shown in FIG. 3.

The low RPM detector 100 receives inputs 210 and 212 from counter 50 by means of NAND gate 250 interconnected to act as a decoder. The output of NAND gate 250 is delivered over lead 252 to the set input of flip-flop 232. The "0" output of flip-flop 232 is delivered over lead 254 to the set input of flip-flop 256. The signal appearing on lead 254 also accesses the remaining input to NAND gae 236. The output of NAND gate 236 is delivered over lead 258 to the reset side of flip-flop 256. The zero output of flip-flop 256 is delivered over lead 102 as previously discussed. The operation of the low RPM detector 100 is the same as that previously discussed for the high RPM detector 70. In operation, the inputs 210 and 212 to NAND gate 250 are normally high when the RPM of the motor is above the predetermined low value. In this state, the output of gate 250 is low causing flip-flop 232 to set. Flip-flop 232 remains in this condition despite a zero resetting signal appearing on lead 182. The output of flip-flop 232, therefore, is zero causing the output of NAND gate 236 on lead 258 to be high and causing flip-flop 256 to set. The output of flip-flop 256 is delivered from the zero output and is normally, therefore, zero. In summary, when the speed of the motor is within the normal operating range, the output of flip-flop 256 over lead 102 is low. This low value on lead 102 is maintained even during the resetting signals appearing on leads 180 and 182. When the speed of the motor drops below the predetermined value, one of the inputs to NAND gate 250 becomes low causing the output on lead 252 to go high. A high signal on lead 252 causes flip-flop 232 to change state immediately. The signal delivered on lead 254 from flip-flop 232 is high enabling NAND gate 236 and causing flip-flop 256 to set. Setting of flip-flop 256 causes the output on lead 102 to go high. A high on lead 102 accesses NOR gate 314 of the delay programmer 110 as shown in FIG. 7 to immediately cause the output on lead 316 to go low thereby forcing the output of gate 318 high and forcing the outputs of gates 324, 388, and 398 to go low. As will be discussed, a low signal output from those three inverter gates releases any retardation on the motor. The high signal on lead 102 from flip-flop 256 is maintained high even though signals on leads 180 and 182 occur. When the signal on lead 182 goes low, flip-flop 232 remains in the set condition. When the signal on lead 180 goes high, a zero is delivered at the output of NAND gate 236 on lead 258 but flip-flop 246 remains in the set state. A switch 209, FIG. 4, is further provided to allow the operator of vehicle 20 to select between two operating ranges of low RPM for releasing retardation.

As is conventional in the art for operation of brake retarders, a throttle switch 39, shown in FIG. 7, becomes activated when the operator of vehicle 20 releases his foot from the accelerator peddle. This releaser information is transmitted over lead 112 to the ground circuit 120. The information on lead 112 is delivered through a one pole of a switch 303, a parallel resistor 302 capacitor 304 combination and is further delivered through resistor 305 to the base of transistor 306. Transistor 306 is preferably of the type manufactured by RCA as Model No. 2N3904. The collector of transistor 306 is connected through resistor 312 to a positive voltage supply and is further connected over lead 122 to one input of a NOR gate 314. The other pole of switch 303 is connected to lead 122. The other input of NOR gate 314 is connected to lead 102 which is delivered from the low RPM comparator 100. The output of NOR gate 314 is delivered over lead 316 to one input of NAND gate 318. The output from the NAND gate 318 is delivered over lead 322 to an inverter gate 324. This completes the detailed description of the interconnection of the throttle control input into the delay programmer 110.

When throttle switch 39 is closed a ground signal is delivered to lead 112. If the vehicle 20 uses a POSITIVE ground, then switch 39 is set, during installation, to provide a connection from lead 112 to lead 122 thereby bypassing transistor 306. If the vehicle 20 uses a NEGATIVE ground, then switch 39 is set, during installation, to activate transistor 306 to provide the correct ground on lead 122. When the throttle switch is open a high signal appears on lead 122.

The brake select input 26 will now be discussed. A mechanical selector switch 340 is provided on the steering wheel 27 of the vehicle 20. The operator of vehicle 20 can select one of four positions. The first position termed the "0" select is the OFF stage in which no retardation of the motor occurs. The second condition termed the "1" select occurs when only two cylinders of the motor are desired to be retarded. The third condition termed the "2" select, occurs when the operator desires to retard four cylinders of the motor 22. The fourth position occurs when the operator selects the "3" position in which all six cylinders of the motor are retarded. The "0" condition is delivered over lead 342 to short capacitor 344 which is charged through resistor 346 to positive voltage and the ground condition is further delivered into one input of NAND gate 348. It is to be noted that the "0" or OFF condition is also delivered over lead 320 to the second input of NAND gate 318. When the "1" condition is selected, no signal indication is delivered into the delay programmer 110. When the "2" indication is selected, the signal is delivered over lead 350 to short capacitor 352 to ground which had been previously charged through resistor 354 to positive voltage. This ground indication is further delivered to the remaining input of NAND gate 348 and to the first input of NAND gate 356. When the "3" select is made, the indication of ground is delivered over lead 358 to short capacitor 360 which had been priorly charged through resistor 362 to a positive voltage. The ground indication is further delivered into the second input of NAND gate 356 and also to inverter 364. The output of NAND gate 348 is delivered over lead 366 to an inverter 368. The output 370 of inverter 368 is delivered to the indicator display. The output of NAND gate 356 is delivered over lead 372 also to the display indicators. The following truth table provides the logic values for these signals appearing on leads 372 and 370:

| 372 | 370 | Display Indication |
| --- | --- | --- |
| L | L | 0 |
| H | L | 1 |
| L | H | 2 |
| H | H | 3 |

The above truth values are obvious from an analysis of the brake select circuitry and the interaction with gates 348 and 356 and inverter 368. Suffice it to say, that all four indications of the switch 340 can be properly displayed based in binary signals appearing on leads 370 and 372.

The output of NAND gate 356 is further delivered over lead 372 to one input of NAND gate 380. The second input to gate 380 is delivered over lead 382 from integrated circuit 384. Integrated circuit 384 is a counter preferably of the type manufactured by RCA as Model No. CD4518B. The pin designations shown in FIG. 7 are those for the preferred integrated cicuit. The outpuf of NAND gate 380 is connected over lead 386 to an inverter 388. Lead 386 is also interconnected to integrated circuit 384. The output of inverter 364 is interconnected over lead 390 to one input of NAND gate 392, the other input of which is connected to the integrated circuit 384 over lead 394. The output of NAND gate 392 is interconnected over lead 396 to an inverter 398 and lead 396 is further interconnected with the integrated cicuit 384. The integrated cicuit 384 is further interconnected over lead 322 to the output of NAND gate 318.

The operation of the delay programmer 110 will now be discussed. With the brake select switch 340 in the OFF position, lead 320 is low thereby disabling NAND gate 318 and placing a high on lead 322. It is to be noted that with the switch 340 at the "0" position, lead 372 is low as is lead 390. The low on lead 372 holds the output of NAND gate 380 high thereby causing the output of inverter 388 to be low. The low indication on lead 390 causes the NAND gate 392 to go high and causes inverter 398 to output a low. Therefore, inverters 324, 388, and 398 are all in the low state when selector switch 340 is the "0" position. Furthermore, NAND gate 318 is deactivated so that any inputs appearing on lead 316 are not tranmitted therethrough. It is understandable that the input from the low RPM detector on lead 102 should not, at this time, interact with any of the delay programmer circuitry. The purpose of the signal on lead 102 is to prevent motor stall when the retarders are activated at low RPMs. Clearly when the selector switch 340 is in the "0" position, no retardation of the motor occurs. Therefore, any signal occurring on lead 102 at this time should properly be ignored. Likewise, any signal from the throttle switch 39 occurring on lead 122 is also properly ignored.

When the selector switch 340 is switched to a retardation value of "1", lead 320 becomes high. Since leads 350 and 358 are high, the output of NAND gate 356 is low and the output of inverter 364 is low, thus, the inverters 388 and 398 are held low. However, the remaining inputs to NAND gate 318 appearing on lead 316 are high so that the output of NAND gate 318 becomes low. A low on lead 322 causes the output of inverter 324 to become high thereby activating the first two cylinders in a retardation fashion as will be subsequently discussed.

When "2" is selected at selector switch 340, lead 350 goes low thereby causing the output of NAND gate 356 to go high and causing NAND gate 380 to go low if the value on lead 382 is high which for the moment it is assumed to be. The low from NAND gate 380 on lead 386 causes the output of inverter 388 to go high. Therefore, if a high value appears on lead 382, both the outputs of inverter 324 and 388 are high thereby effecting retardation of four cylinders of motor 22.

If a brake select of "3" is activated, lead 358 goes low, keeping the output of NAND gate 356 at a high value thereby activating the output of inverter 388 to be high if the value on lead 382 is also high which for the moment it is assumed to be. Furthermore, the low on lead 358 causes the output of inverter 364 to become high thereby activating the NAND gate 392 into a low position if a value of high appears on lead 394. For the moment, a high is presumed to appear on lead 394 thereby causing NAND gate 392 to output a low on lead 396 and thereby causing the output of inverter 398 to go high. Therefore, with a high appearing from the outputs of inverters 324, 388, and 398, all six cylinders of the motor are retarded.

In summary, when "1" is selected on switch 340, the output of inverter 324 becomes high. When a "2" is selected on switch 340, the output of inverter 388 also becomes high if lead 382 is high and finally, if a "3" is selected on switch 340, the output of inverter 398 also becomes high if the value on lead 394 is high.

The operation of counter 384 will now be discussed. Initially the counter 384 is reset to zero by a high signal appearing on lead 322. The transition from a high to a low enables the counter 384 to start counting if the signal on lead 386 is high. The signal on lead 386 is high since the input on lead 382 to NAND gate 380 is at zero. Therefore, counter 384 commences counting and continues until the signal on lead 382 becomes high, the output 386 of NAND gate 380 becomes low and the counter 384 is inhibited from counting. The second half of the counter operates in the same way as previously discussed. Clock pulses are conventionally provided from an astable multivibrator 383 over lead 385 and the frequency of these pulses can be varied by adjustment of potentiometer 387 in conjunction with capacitor 389. Multivibrator 383 is a conventional RS-355.

Assuming switch 340 is selected to a brake "3", then the outputs of all inverters 324, 388, and 398 are held high indicating that all six cylinders of the motor 22 are being retarded. In that event, a high appears on lead 320 enabling NAND gate 318. If in this condition, the motor should stall, as previously discussed, a low to high transition occurs on lead 102. Irregardless of the value appearing on lead 122, the output of NOR gate 314 places a low signal on lead 316. A low signal to the NAND gate 318 causes the output to go high thereby immediately causing the output of the inverter 324 to go low. The high signal on lead 322 is further extended to the integrated circuit 384 which resets the counter and causes the outputs on leads 382 and 394 to go low, thereby effectuating low outputs in each of the inverters 388 and 398. Thus, when a low signal appears on lead 102, indicating that stalling is occurring and that the retarder should be immediately released, the outputs of inverters 324, 388 and 398 immediately go low thereby deactivating all retardation in the motor.

In summary, the operator of switch 340 upon seeing a hazard or obstacle in the road ahead dials in selectively retardation of two cylinders, four cylinders, or all six cylinders. In the event that too much retardation occurs, the control system of the present invention detects a low RPM in the motor and immediately effectuates release of all retardation to the motor. Or, in the event the operator deems it necessary to release retardation, he can depress the accelerator thereby causing immediate releasing of retardation to the motor. Clearly, when the throttle is released or when the motor speed climbs above the predetermined low value, retardation as it was before the override exists.

In certain emergencies, the operator may wish to activate switch 209 to release any retardation at a higher RPM value than normally used. Such an event would occur for example when the operator suddenly comes to a snow drift or icy patch across the road when traveling at a high rate of speed. The operator activates switch 209 and releases his foot from the throttle. No retardation occurs since a higher value of RPM prevents activation of the retarders. This is highly desirable since the operator wants the vehicle 20 to "roll" through the snow drift or icy patch rather than to risk any "sliding" due to retardation.

The detailed description of the output drivers 90, the auxiliary bypass 36 and the brake light circuit 37, and the high RPM control 129 will now be discussed. The high RPM control 129 comprises a plurality of NOR gates 400, 402, and 404, which are respectively interconnected to inverters 324, 388, and 398, over leads 126. In addition, each NOR gate 400, 402 and 404 additionally receives a common input over lead 406. The output of NOR gates 400, 402 and 404 respectively access inverters 408, 410, and 412.

The operation of the high RPM control 129 will now be discussed. As previously mentioned, when retardation is OFF, the signals occurring over bus 126 from the delay programmer 110 are all low. Both inputs to NOR gate 400 are low causing its output to go high thereby driving the output of the inverter 408 low. In the event that retardation is ON, the low becomes a high on bus 126 causing the output of NOR gate 400 to be low, so that the output of inverter 408 is high. Therefore, any signals occurring on the bus from the high RPM control 129 that are high represent retardation while any low signal represents no retardation of the respectively controlled cylinders. In the situation where no retardation occurs, the inputs over bus 126 to NOR gates 400, 402 and 404 are held low. Therefore, lead 406 must normally be low in order to provide a low output from inverter 408. In the event, as previously discussed, that the speed of the motor 22 exceeds a predetermined high value, a high pulse is generated on lead 72 from the high RPM comparator and that high pulse is reflected through NOR gate 400 as a low pulse and through inverter 408 as a high indication. The high indication therefore on lead 72 immediately effectuates retardation for all six cylinders since all inverters 408, 410 and 412 become high.

In the event that retardation of the motor slows the motor down to its normal operating level, the high indication on lead 72 goes away and the motor returns to it's normal operating speed. Disclosed in series with lead 72 in the output driver circuit 90 is a switch 430 which provides the option of the driver to bypass the automatic predetermined cut-off level of retardation in the event the operator of the vehicle wants to operate at a higher RPM level.

The bus from the high RPM control 129 accesses a three-stage relay 432 which is activated at the operator's option by a switch in a conventional fashion located on the dash of the vehicle 20. In normal operation, the bus is delivered through the auxiliary bypass circuit 36 to bus 37. In the event, however, that the retardation control system 10 of this invention fails, or malfunctions, the operator of vehicle 20 has the opportunity of conventionally operating the brake retardation system. By activating relay 432 so that the input 112 from the throttle switch 300 directly controls retardation, in a conventional fashion, of the motor 22. The values on bus 37 act as conventional output drivers 90 which drive the retardation brakes in a conventional fashion.

The output drivers 90 comprise conventional power transistors 500 which are receptive at the base connection of the bus 37. The emitter of each transistor 500 is grounded and the collector is conveyed over bus 502 to the optional fuel safety switch 34. The fuel safety switch comprises a gang of switches 504 which are selectively closed by means of mechanical linkage 506. The fuel safety switch 34 may comprise any conventional relay operated system which is responsive to the fuel in the fuel line being fully consumed at a point of time after the throttle is deactivated by the operator of vehicle 20. Such a system is disclosed in copending application entitled "Fuel Safety Switch" invented by Robinson and identified as U.S. Pat. No. 4,099,166, issued July 4, 1978 filed June 1, 1976. The output of the fuel safety switch circuit 34 is delivered over bus 508 into the motor brake retarders 24.

The portion of the bus 508 containing the activation lead for the first set of retarders is further delivered over lead 510 to the brake light circuit 37, to activate the coil of a relay 512 disposed therein. In a conventional fashion, the activation of the coils of the relay causes the brake lights to turn on whenever retardation of the motor occurs.

The circuit details for the display 40 will now be discussed. The display 40 contains a conventional numerical display. The display is divided into three categories including the RPM display 44, the brake select display 42 and the warning display 46. Both the RPM display 44 and the brake display 42 are driven by conventional latch circuits 550 which store the information to be displayed for the length of time between updates. It is to be noted that the input to the zero position of the RPM display 44 is grounded over lead 552. The upper three digits of the RPM display 44 are continually updated by means of counter 554. Counter 554 is a conventional binary counter which starts counting when the signal on lead 558 goes high. Any pulses appearing on lead 202 which is from the output of gate 200 from the counter 50 causes the counter 554 to commence counting. These pulses appearing on lead 202 are the pulses that are representative, as previously discussed, of the speed of the motor. After a predetermined time has elapsed, the count appearing on counter 554 is gated into the latches 550 by a signal appearing on lead 560 from the decade counter and decimal decoder 154. There are six leads in bus 560 with each lead going to a separate unique digit in the RPM 44 and brake 42 display units. The signal appearing on bus 560 is such that at the same time, the data appearing in the inputs to the latches 550 is automatically gated in. The counter 554 is then reset by a pulse appearing on lead 192 and a new count begins. Just before the new count to be displayed appears in the latches 550, a signal arises on lead 194 causing the latch circuits to be reset. In this manner, the displays 44 and 42 are continually and repeatedly updated. It is to be expressly understood that any of a number of conventional display units may be contrived which can properly display the intended data of this invention. The circuit shown in FIG. 9 is shown only for completeness and is by no means intended to limit or delimit the scope of this invention.

Whenever the brake retard control system of the present invention is activated, switch 562 is turned on to visually display an indication that the brake select is on as represented by the "S". The amount of brake select is also displayed as represented by the numerical designation for example of 37 2" and the associated latch circuit is under control of data appearing on leads 370 and 372 as previously discussed in the discussion of FIG. 7. The warning indicator 46 is activated whenever a pulse appears on lead 72 which is the output of the high RPM comparator 70 to set flip-flop 373.

The operation of the brake control system of the present invention will not be discussed. Assume the vehicle 20 to be traveling down a freeway at conventional speed limits. In this mode of operation, the operator of vehicle 20 has his foot depressing the throttle of a truck thereby maintaining switch 39 in the closed position as shown in FIG. 7. As discussed, this forces the outputs of inverters 324, 388, and 398 to have low outputs thereby keeping the brake retarders 24 in an OFF condition. As long as the operator of vehicle 20 maintains his foot on the throttle, retardation cannot possible occur.

While traveling down the freeway, assume that the operator of the truck has set the hand-held switch 26 to a retardation value of "2" (i.e., retardation of four cylinders). In this mode of operation, as long as his foot depresses the throttle, no retardation can occur. However, upon removal of his foot from the throttle, switch 300 opens up thereby enabling the delay programmer 110 to function. As previously discussed, a retardation select of "2" activates first the output of inverter 324 to go high and after a predetermined delay, the output of inverter 338 to go high. While the release of the foot from the throttle prevents the introduction of any new gas into the fuel system, any existing gas in the fuel system must be combusted before the fuel safety switch 34 closes. Therefore, retardation immediately appearing at the output of inverter 324 is a high condition but this condition is not extended through to the brake retard for the first two cylinders until switch 34 closes. Therefore, in operation, the operator releases his foot from the throttle, the delay programmer circuit 110 becomes activated, but no signals from the delay programmer 110 are extended to the brakes 24 until switch 34 closes. Typically, switch 34 closes within 0.2 to 0.7 seconds after the throttle is released by the operator. Therefore, retardation of the first two cylinders does not occur until all of the fuel is combusted. The brake light circuit 37 immediately activates upon the closure of switch 34. The second two cylinders to be retarded, however, will be retarded after the predetermined delay which is typically three seconds. Thus, at the time of the application of the second retardation, the fuel safety switch 34 has been fully activated.

Assume the operator of vehicle 20 is traveling down a steep incline and he has selected a retard value of "2" which means that four cylinders are to be retarded. In the conventional situation, upon hitting a wet or sandy spot in the road, the motor may stall due to the heavy retardation of the motor (i.e., four of six cylinders being braked). The momentum of the truck during stall, however, causes a skid with the wheels locked thereby causing a jack-knife situation. The brake control system of the present invention upon sensing the speed of the motor dropping below a predetermined low RPM level, outputs a pulse over lead 102 from the low RPM detector 100 to NOR gate 314 of the delay programmer 110 to totally deactivate the delay programmer 110. Therefore, the appearance of a low signal on lead 102 effectuates a corresponding low signal output from inverters 324, 388 and 398 thereby stopping all retardation of the motor. Since all retardation or braking of the motor has occurred, the stall is prevented because the motor is allowed to idle. When the speed of the motor increases, the signal appearing on lead 102 becomes high and retardation is once again allowed to occur on the downhill journey.

Assume that while traveling downhill in a mountainous terrain, the operator has all six cylinders braked (i.e., a select value of "3"), and he reaches the bottom of the hill and commences a journey up another hill. Conventionally, the truck driver must down-shift in order to gain proper power going up the next incline. Under the teachings of this invention, however, in order to gain that subsequent additional power, all the operator of vehicle 20 need do is to adjust the manual switch 26 from a value of "3" to a value of "2" then to a value of "1" and then to a value of "0". This provides increasing momentum power to the vehicle 20 as it attempts to climb the second hill. All down-shifting has been substantially eliminated. This produces a great savings both in time and in gas comsumption for an arduous trip through the mountains or hills.

Assume a malfunction occurs which causes the motor to "runaway" in speed. When the speed of the motor exceeds a high RPM value, a signal is generated from the high RPM detector 70 over lead 72 and into the high RPM control circuit 129 to immediately activate retardation on all six cylinders. Should, however, the operator of the vehicle 20 desire to drive the motor at an RPM level above the predetermined level, by activating switch 430, he can prevent the delivery of the pulse from the high RPM detector 70 over lead 72 and into gates 400, 402 and 404. Whenever a pulse is generated on lead 72 indicative of exceeding the motor above the high RPM level, the warning indicator light 46 is activated.

Whenever retardation of the brake control system 10 of the present invention occurs, it occurs sequentially. This sequential operation is vital to the protection of "live" loads and for overall control of the truck since it is highly preferable to stop the truck in a gradience of braking rather than sudden braking. This has been known to be true especially on icy, wet, or sandy surfaces and especially involving live loads such as animal loads or liquid loads. The brake control system of the present invention performs the gradient of sequential application of the retardation by means of the digital interplay between circuit 384 and gates 380 and 392 as previously discussed appearing in FIG. 7. Clearly, provision can be made either for the operator or for the installer of this system to adjust potentiomer 387 to provide variance in the amount of delay appearing between the sequential operations thereof. The circuit shown in FIG. 7 for potentiometer 387 and capacitor 389 is by way of illustration only, and is not meant to limit or delimit the scope of this invention.

Furthermore, an auxiliary bypass switch 36 is provided so that in the event of malfunction of the control circuit 30 of the present invention, a manual override may occur to allow the operation of the brakes to occur conventionally.

The above examples are not meant to limit the motor control system of the present invention to vehicle 20. A skilled mechanic can adapt the teachings of this invention to such diverse systems as sprinkling systems, greenhouses, sewage treatment systems, water treatment systems, refrigeration systems, heavy army equipment, railroad trains, commuter systems, airplanes, smoke abatement, air control-mining, etc., wherein motors using conventional motor retarders are used.

Therefore, although the prevent invention has been described with a certain degree of particularity, it is understood that the present disclosure has been made by way of example and that changes in details of structure may be made without departing from the spirit thereof.

We claim:

1. A motor control system for use on a motor having cylinders and a motor brake retarder to control motor runaway, said motor brake retarder being capable of retarding said cylinders of said motor, said system comprising:
    means cooperative with said motor for generating a series of pulses, the frequency of said pulses varying in proportion to the speed of said motor,
    means responsive to said series of pulses for signalling when the speed of said motor exceeds a predetrmined value, and
    means receptive of said automatic signal for automatically activating said motor brake retarder to retard all of said cylinders.

2. The motor control system of claim 1 wherein said activating means comprises:
    means receptive of said pulses during a predetermined time frame for counting said pulses, and
    means cooperative with said counting means for enabling said retarders when said count exceeds a predetermined value.

3. A motor control system for use on a motor having cylinders and a motor brake retarder to control motor runaway, said motor brake retarder being capable of retarding said cylinders of said motor, said system comprising:
    means cooperative with said motor for generating an electrical signal when the speed of said motor exceeds a predetermined high amount, and
    means receptive of said electrical signal for automatically activating said retarder to retard all of said cylinders.

4. The motor control system of claim 3 further comprising a second means receptive of said electrical signal for providing a warning indication.

5. The motor control system of claim 3 wherein said activating means further automatically deactivates said retarder when the speed of said motor drops below a predetermined low amount.

6. A motor control system for use on a motor having cylinders and a motor brake retarder to control motor runaway, said motor brake retarder being capable of retarding said cylinders of said motor, said system comprising:
    a speed sensor connected to said motor for generating a series of electrical pulses, said series of electrical pulses being proportional to the mechanical speed of said motor, means receptive of said series of pulses for counting the number of pulses in a predetermined time interval, a high RPM detector operative when said pulse number in said counting means exceeds a predetermined value for generating an electrical signal, means receptive of said electrical signal for automatically activating said retarder to retard all of said cylinders.

* * * * *